US012631054B2

(12) United States Patent
Pettengill

(10) Patent No.: US 12,631,054 B2
(45) Date of Patent: May 19, 2026

(54) MOTOR VEHICLE LOCK, IN PARTICULAR A MOTOR VEHICLE DOOR LOCK

(71) Applicant: Kiekert Aktiengesellschaft, Heiligenhaus (DE)

(72) Inventor: Robert S. Pettengill, Farmington, MI (US)

(73) Assignee: Kiekert Aktiengesellschaft, Heiligenhaus (DE)

( * ) Notice: Subject to any disclaimer, the term of this patent is extended or adjusted under 35 U.S.C. 154(b) by 62 days.

(21) Appl. No.: 18/438,895

(22) Filed: Feb. 12, 2024

(65) Prior Publication Data

US 2025/0257591 A1 Aug. 14, 2025

(51) Int. Cl.

*E05B 79/10* (2014.01)
*E05B 83/36* (2014.01)
*E05B 85/24* (2014.01)

(52) U.S. Cl.

CPC .............. *E05B 79/10* (2013.01); *E05B 83/36* (2013.01); *E05B 85/243* (2013.01)

(58) Field of Classification Search

CPC ........................... E05B 81/20; Y10T 292/1082
See application file for complete search history.

(56) References Cited

U.S. PATENT DOCUMENTS 5,288,115 A * 2/1994 Inoue ...................... E05B 81/20 292/216
5,829,198 A 11/1998 Watanabe
5,938,252 A * 8/1999 Uemura .................. E05B 81/14 292/216
6,003,910 A * 12/1999 Dupont ................... E05B 81/14 292/216
6,471,259 B1 * 10/2002 Weyerstall .............. E05B 81/14 292/216
7,261,338 B2 8/2007 Spurr
7,380,844 B2 * 6/2008 Berghahn ................ E05B 81/20 292/216
7,475,922 B2 * 1/2009 Ottino ..................... E05B 85/26 292/216
8,033,584 B2 * 10/2011 Akizuki .................. E05B 81/20 292/201
8,684,424 B2 * 4/2014 Wattebled ............... E05B 81/68 292/201
8,757,681 B2 * 6/2014 Graute .................... E05B 81/20 292/216
9,810,004 B2 * 11/2017 Scholz .................... E05B 81/20
2011/0187129 A1 8/2011 Graute

FOREIGN PATENT DOCUMENTS

CN 110259292 A * 9/2019 ............. E05B 85/00
DE 102005048564 A1 * 4/2007 ............. E05B 81/20
DE 202008015789 U1 * 4/2010 ............. E05B 81/21
DE 102018113270 A1 * 12/2019 ............. E05B 81/21
DE 102021100462 A1 7/2021

* cited by examiner

*Primary Examiner* — Carlos Lugo
(74) *Attorney, Agent, or Firm* — Renner, Otto, Boisselle & Sklar, LLP.

(57) ABSTRACT

A motor vehicle lock, in particular a motor vehicle side door lock, having a locking mechanism consisting of a rotary latch and at least one pawl, a closing device having at least one drive pawl for driving the rotary latch, wherein the drive pawl can be brought into engagement with the rotary latch a lock housing, and wherein the drive pawl can be disengaged from the rotary latch by actuation of a release lever.

17 Claims, 3 Drawing Sheets

MOTOR VEHICLE LOCK, IN PARTICULAR A MOTOR VEHICLE DOOR LOCK

FIELD OF DISCLOSURE

The invention relates to a motor vehicle lock, in particular a motor vehicle side door lock, having a locking mechanism consisting of a rotary latch and at least one pawl, a closing device having at least one drive pawl for driving the rotary latch, wherein the drive pawl can be brought into engagement with the rotary latch by means of a lock housing.

BACKGROUND OF DISCLOSURE

In order to increase the comfort in a motor vehicle and to make it as easy as possible to operate a motor vehicle, more and more comfort functions are being integrated into the motor vehicle. For example, it is known that motor vehicle doors, hatches, or hoods are closed by means of a closing device to assume a completely closed position. On the one hand, this can be due to the fact that easy closing of the door is to be made possible for the operator and, on the other hand, an outer door handle can be dispensed with, for example, in order to achieve a corresponding design on the motor vehicle. Such closing devices are often used, particularly in fully automatic tailgates. These hatches can then be operated, for instance, without manual operation of the hatch itself, merely by means of a radio remote control.

Such locking systems, which are equipped with a closing device, are basically used for all possible doors in a motor vehicle. This means that not only side doors, but also trunk doors, tailgates or engine hoods can be acted upon and are included in the scope of the invention. With the help of the closing device realized in this way, a locking mechanism of a locking system and therefore the relevant door or hatch can be moved from a pre-latching position to a main latching position against the resistance of a seal.

The design of a closing device is the subject matter of DE 20 2008 015 089 U1. Provided herein is a transmission lever mounted on the same axis as an axis of a rotary latch of the locking mechanism. In addition, a drive pawl is mounted on a transmission lever. The drive pawl is in turn connected to the drive by means of a Bowden cable or another means of connection.

DE 10 2021 100 462 A1 discloses a motor vehicle lock with a locking mechanism consisting basically of a rotary latch and a pawl as locking mechanism components, furthermore a closing and opening device with at least one drive and a lever chain actuated thereby. The lever chain interacts with a drive pawl for driving the associated locking mechanism component. In order to be able to interrupt the closing process in the event of becoming jammed in the door, for example, the document proposes interrupting the closing or opening process. In order to interrupt the closing process, the motor vehicle lock is equipped with a disconnection point which can undo the engagement of the drive pawl with the locking mechanism component.

In principle, it is sometimes necessary to interrupt an opening movement by means of a closing interruption when the locking mechanism is actuated. In this case, the opening device does not act on the rotary latch via the drive unit and the thereby actuated lever chain and the drive pawl following the lever chain, but rather on the pawl, and ensures during an opening process that the pawl is lifted from its engagement with the rotary latch when the locking mechanism is in a closed state. As a result of this, the rotary latch can open with the assistance of a spring and can release a previously captive locking bolt. If such an opening movement is interrupted, this can be done again by the drive pawl being lifted from its engagement with the pawl in the example. However, with closing devices and a corresponding closing process, the problem routinely arises of being able to realize an emergency interruption.

With the aid of such closing devices, the relevant tailgate or motor vehicle side door is transferred from the pre-closed position, which is brought about manually or electrically, into a main closed position or main latching position with the aid of an electric drive. If, for example, clothing or, worse still, fingers of an operator become jammed in a door gap during this process, a type of emergency opening is required, or the associated closing process must be interrupted. In the event of such an emergency interruption, the procedure is generally such that the drive pawl for driving the associated locking component is immediately lifted from its engagement with the rotary latch in the event of the closing movement already described above.

The prior art mentioned above has basically proven itself in this area. It is necessary that the ejection of the drive pawl can be performed safely at any time in the course of an emergency interruption. The invention starts at this point.

SUMMARY OF DISCLOSURE

The invention is based on the technical problem of further developing such a motor vehicle lock and in particular a motor vehicle door lock in such a way that the possibility for realizing a flexible interruption can be reliably implemented at any time.

The object of the invention is to provide an improved motor vehicle lock with a closing device. Furthermore, it is the object of the invention to reliably realize the comfort function with the smallest possible number of components.

According to the invention, the object is achieved by the features described herein. Advantageous embodiments of the invention are further specified herein. It should be noted that the embodiments described below are not restrictive; rather, any variation of the features described in the description and the dependent claims is possible.

According to the description herein, the object of the invention is achieved in that a motor vehicle lock, in particular a motor vehicle side door lock, is provided, having a locking mechanism consisting of a rotary latch and at least one pawl, a closing device having at least one drive pawl for driving the rotary latch, wherein the drive pawl can be brought into engagement with the rotary latch by means of a lock housing, and wherein the drive pawl can be disengaged from the rotary latch by means of an actuation of a release lever. As already stated above, the closing process must then be interrupted if, on the one hand, a corresponding signal is transmitted to the lock to open the door again, or when, for example, jamming is detected while closing. In this case, the release lever is actuated manually or electrically and initiates an interruption of the closing process indirectly or directly. The design of the motor vehicle lock according to the invention enables a direct interaction between the release lever and the interruption of the closing process. In other words, the interruption of the closing process is accompanied by the actuation of the release lever. During closing, the drive pawl is directly connected operatively to the rotary latch and moves the rotary latch from a pre-latching position into a main latching position. This closing is directly interrupted by the actuation of the release lever, and the rotary latch is released from the drive pawl. By actuating the release lever, the currently unloaded pawl is likewise moved out of the engagement region with the rotary latch simultaneously, i.e., parallel to the interruption of the closing process.

If the release lever can be brought into engagement indirectly with the drive pawl, an advantageous embodiment variant of the invention results. The indirect transmission of the trigger force to the drive pawl opens up the possibility of using a transmission ratio between the release lever and the drive pawl. While closing, the rotary latch is moved against the force of a seal on the motor vehicle. In particular with large doors, but also with new vehicles with high sealing forces, large forces can be necessary here. The door is closed exclusively via the rotary latch. The forces increase more and more the further the rotary latch moves the door into the closed position. In order to provide the possibility of releasing the drive pawl from engagement with the rotary latch even in the case of the almost completely closed side door or hatch, a corresponding transmission ratio between the release lever and the drive pawl can be advantageous.

If the release lever can be brought into engagement with an ejector lever, a further embodiment variant of the invention can be realized. The use of a lever for deflecting the drive pawl is advantageous on the one hand for setting a transmission ratio and, on the other hand, the use of an ejector lever offers a structurally favorable possibility for realizing the interruption of closing.

The release lever is preferably accommodated pivotably in the motor vehicle lock and in particular in a lock housing part. The release lever can be actuated manually or electrically. A manual actuation can be moved, for example, by an external door handle or an inner door handle and accordingly by an external actuating lever and an internal actuating lever. However, it is also conceivable for the release lever to be moved in an electrically actuated manner. For example, a pushbutton or sensor can be present on the inner door handle or outer door handle, wherein a signal to an electrical drive in the motor vehicle lock is actuated via the pushbutton or sensor so that the release lever can be actuated directly or by means of an interposed gearbox.

If an electrical actuation of the release lever is provided in the vehicle by means of a pushbutton, combined solutions of electrically actuated and mechanical movement of the release lever are also conceivable according to the invention. The release lever is pivotably mounted in the motor vehicle lock and can be actuated electrically or manually as described above. For this purpose, the release lever can be designed with two arms, wherein a first arm serves to introduce an actuating force, and a second arm is in engagement with the ejector lever. The release lever is therefore given a double function. On the one hand, the release lever serves to unlock the locking mechanism and, on the other hand, the closing process can be interrupted with the release lever. For this purpose, the release lever can also be designed with three arms, for example. As described above, the release lever can have an actuating arm for electrical and manual actuation, a second arm for actuating the ejector lever and, for the basic function of the release lever, a third arm for actuating the pawl.

It can be advantageous here and represent a further embodiment variant of the invention if the release lever engages at least partially over the ejector lever. The ejector lever is movably accommodated in the motor vehicle lock and is able to release the drive pawl from engagement with the rotary latch. If the ejector lever has an extension which extends in the direction of the release lever and the release lever is pivotably mounted in such a way that the release lever can engage in the extension of the ejector lever, a structurally favorable arrangement of a mechanism for ejecting the drive pawl can be realized. In other words, the ejector lever is accommodated in the motor vehicle lock so as to be displaceable or pivotable such that the ejector lever protrudes on the one hand into the pivoting region of the release lever and, on the other hand, is able to move the drive pawl out of engagement with the rotary latch. In this case, the ejector lever has to be accommodated in the motor vehicle lock in such a way that, in the non-actuated state of the ejector lever, the drive pawl is able to enter into engagement with the rotary latch and, on the other hand, it must be possible for the ejector lever to be moved by actuating the release lever of the ejector lever such that a force on the drive pawl is achieved so that the drive pawl is moved out of engagement with the rotary latch.

It can be advantageous for the ejector lever to be pivotably mounted in the motor vehicle lock, preferably in a lock case of the motor vehicle lock. Pivotable mounting enables a structurally simple accommodation of the ejector lever in the motor vehicle lock. In particular, a transmission ratio can be adjustable in a structurally simple manner by means of a pivoting bearing. If, for example, the ejector lever is mounted at a distance from the engagement region with the release lever in the motor vehicle lock, and an actuating contour on the ejector lever is arranged between the bearing point of the ejector lever and the engagement region with the release lever, a transmission ratio can be achieved which has a high transmission ratio and consequently provides sufficient force to decouple the drive pawl from the rotary latch. A long lever arm for actuating the ejector lever and a short lever arm between the bearing point of the ejector lever and actuating contour provide a structurally advantageous embodiment variant for achieving a high transmission ratio.

It can furthermore be advantageous if the ejector lever has a control contour for engagement with the drive pawl. The ejector lever can preferably be mounted pivotably in the motor vehicle lock and can be driven pivotably by means of the release lever. If a control contour or actuating contour is arranged on the ejector lever, a very precise guidance and ejection of the drive pawl can be carried out. For this purpose, the control or actuating contour can be arranged, for example, as an elevation on the ejector lever, wherein the elevation can be brought into engagement with the drive pawl. The drive pawl can, for example, also have a chamfer or an extension or a bolt which can be brought into engagement with the control contour. In order to actuate or eject the drive pawl, according to the invention, there is therefore an interaction of the release lever, the ejector lever and the drive pawl.

The release lever is actuated electrically or manually and is preferably moved pivotably about an axis in the motor vehicle lock. By means of the pivoting movement of the release lever, the ejector lever can in turn be pivoted about its bearing shaft, whereby the control contour on the ejector lever comes into engagement with the drive pawl. Due to the dual function of the ejector lever, not only is the ejector lever actuated here, but also the pawl is brought out of engagement with the rotary latch or ultimately held. Due to the dual function of the ejector lever, a reliable interruption of the closing process can be brought about here with little design effort.

In a preferred embodiment variant, the drive pawl can be brought into engagement with the control contour of the ejector lever by means of a bolt. The drive pawl is part of the closing drive and is accordingly pivotably accommodated in the closing drive. The drive pawl can be brought into engagement with the rotary latch on one side, and the closing pawl cooperates with the ejector lever on the opposite side of the pivot axis. A cylindrical extension can be mounted on the closing pawl in order to create a constructively favorable option for swiveling the closing pawl or drive pawl and moving it out of engagement with the rotary latch.

In the simplest case, this can be a cylinder pin which is non-detachably connected to the drive pawl, for example by means of riveting. The cylindrical shape has the advantage that a sliding and always identical part of the bolt can be brought into engagement with the control contour. A cylindrical surface also offers a small contact surface on the control contour so that, on the one hand, low friction losses between the cylindrical surface and the control contour can be expected, and on the other hand the cylinder or bolt provides sufficient stability in order to move the drive pawl out of engagement with the rotary latch. Of course, the bolt or cylinder pin can also be connected to the drive pawl by means of a releasable, for example screwing method.

Preferably, the drive pawl is manufactured from a metallic material, preferably a steel material, as a sheet metal strip. The drive pawl can also have one or more chamfers so that an installation-space-optimized arrangement can be achieved in the motor vehicle lock and, furthermore, optimized engagement ratios can be realized, for example, between the drive pawl and the rotary latch. The drive pawl can interact directly with a contour of the rotary latch, i.e., act on the rotary latch in the plane of the locking mechanism or interact with a bolt arranged on the rotary latch, for example. Depending on the embodiment of the locking mechanism and available space in the motor vehicle lock, a suitable design selection can therefore be made available to engage the drive pawl in the rotary latch.

An embodiment variant of the invention can again be provided if the drive pawl can be actuated by means of a lever mechanism. The closing mechanism is actuated by means of an electric drive. In this case, an electric motor can be arranged directly on the motor vehicle lock or in the motor vehicle lock and, for example, actuate the lever mechanism via a gear stage. However, the lever mechanism is preferably actuated by means of an external electrical drive, which can also be called a closing drive. For this purpose, a Bowden cable unit can be arranged between the closing drive and the lever mechanism. The Bowden cable unit can then be accommodated in a lock case of the motor vehicle lock, for example, to securely transmit the closing forces. The Bowden cable unit or a Bowden cable unit nipple arranged at the end of the Bowden cable can be suspended from a first lever element. The first lever element is then pivotably fastened to a second lever element, the so-called actuating lever. The actuating lever itself, as a second lever element, interacts with the third lever element, the drive pawl, or the drive pawl is pivotably mounted in the actuating lever. The lever mechanism in the advantageous embodiment according to the invention thus has three lever elements, wherein the first lever element and the third lever element are each pivotably mounted in the actuating lever.

In a further advantageous embodiment variant of the invention, the lever mechanism can be mounted at least partially on a shaft of a locking mechanism. The mounting of the lever mechanism and in particular of the actuating lever on a shaft of a locking mechanism part offers several advantages. A first advantage is that no separate bearing point for the actuating lever in the motor vehicle lock has to be provided. This makes it possible to realize the closing mechanism with the smallest possible number of components. A second advantage is that the bearing shaft of the locking mechanism is accommodated in the metallic lock case of the motor vehicle lock.

Due to the preferably non-detachable connection between the metallic bearing shaft of the locking mechanism and the metallic lock case, a stable mounting of the actuating lever can be provided so that the sometimes high closing forces can also be reliably transmitted to the rotary latch. As a third advantage, the bearing shaft of the locking mechanism parts can be provided with a reinforcing plate so that an extremely stable bearing point can be made available for the actuating lever. The shaft is preferably a shaft of the pawl of the locking mechanism in which the actuating lever is accommodated. This is advantageous because, due to the spaced-apart bearing of the actuating lever from the rotary latch, favorable transmission ratios in the actuating lever can be set in order to be able to introduce a correspondingly high force into the rotary latch for closing.

Overall, this results in a structurally favorable design of the closing mechanism in combination with the ejector mechanism for the closing drive. The arrangement of the lever mechanism on the pawl shaft in the immediate vicinity of the release lever and the ejector mechanism offers the possibility of a compact design of the motor vehicle lock with maximum functionality. It is possible to work with a small number of components, some of which take on double functions, so that all the functions of the closing and ejector functionality can be achieved with a small number of components. As already described above, the release lever has the dual function of actuating the pawl and the ejector lever, and the housing on the one hand protects the mechanics and/or electronics in the lock and is simultaneously available to control the drive pawl. The locking mechanism part shaft of the pawl serves, on the one hand, to receive the pawl, and furthermore to stabilize the overall locking mechanism in that the reinforcing plate is held, and additionally serves as a bearing point for the actuating lever of the closing mechanism. A high degree of functionality can consequently be made available in a compact design.

According to the invention, when referring to a motor vehicle lock, synonyms such as locking device, lock or door lock are synonymous with each other. The term “motor vehicle lock” also includes locks that are used in doors, sliding doors, hatches and/or covers in motor vehicles, i.e., wherever components that can be pivoted or moved on the vehicle must be held securely in position. A preferred feature of the motor vehicle lock according to the invention relates to a side door. Motor vehicle locks of this type comprise a locking mechanism consisting of a rotary latch and a pawl.

The locking mechanism can also be equipped with two or more pawls or, for example, have a detent or blocking lever. Such pawls are known from the prior art. In this case, the pawl engages directly with the catch and the locking or blocking lever secures the position of the pawl in the latching position, preferably the main ratchet position. In recent developments, locking parts mounted in the rotary latch are also used, which on the one hand are referred to as latching elements, and which, on the other hand, enable easier and more quiet opening of the locking mechanism.

A drive which is spaced apart from the motor vehicle lock and also a drive arranged on or in the motor vehicle lock can be used as a drive for the closing process. In external electrical drives, which can also be equipped with a transmission, a Bowden cable unit can be used for force transmission and then interacts with the lever mechanism in the motor vehicle lock. However, it is also conceivable for an electrical drive arranged on or in the motor vehicle lock to act on the lever chain directly, or to act on the lever chain by means of a gearbox. In any case, the electric drive provides the force or the torque for closing the locking mechanism.

As already explained above, the closing causes the locking mechanism to be transferred from a pre-latching position into a main latching position. The pre-latching position is usually initiated manually by, for example, closing a side door. However, the pre-latching position can also be achieved by means of an, for example, electrical closing of a door element, as is often the case, for example, with sliding doors or tailgates, or as is standard in current motor vehicles. In the pre-latching position, the motor vehicle door or hatch is still in an open position with a door gap of preferably less than 6 mm being present, but with the door no longer being able to be opened. From this pre-latching position, the door is transferred by means of the closing device into a main latching position or closed position in which the door is then completely closed and ready for operation.

During closing, the drive pawl is directly engaged with the rotary latch. In the non-actuated state of the closing device, the drive pawl is disengaged from the rotary latch. Only after activation of the closing device is the drive pawl pivoted toward the rotary latch and engages with the rotary latch. In other words, the locking mechanism is first moved, for example, manually into a pre-latching position, wherein the operator manually closes a tailgate or a sliding door or a side door, and then the locking mechanism is transferred from the pre-latching position into the main latching position. In the pre-latching position, the drive pawl is in the motor vehicle lock at a distance from an engagement surface on the rotary latch. If, for example, the pre-latching position is detected by means of a sensor, for example a microswitch, the drive for the closing device receives a signal, and the drive pawl is actuated. Only when the drive pawl is actuated does the drive pawl come into engagement with an engagement surface on the rotary latch. The closing drive can then transfer the locking mechanism from the pre-latching into the main latching position. A direct engagement of the drive pawl with the rotary latch leads to a direct transmission of force between the drive pawl and the rotary latch, so that closing with the smallest possible number of components can be realized.

BRIEF DESCRIPTION OF DRAWINGS

The invention is explained in more detail below with reference to the accompanying drawings. However, the principle applies that the embodiment does not limit the invention, but is merely an advantageous embodiment. The features shown can be implemented individually or in combination with further features of the description as well as the claims—individually or in combination.

In the figures.

DETAILED DESCRIPTION

Figure 1:
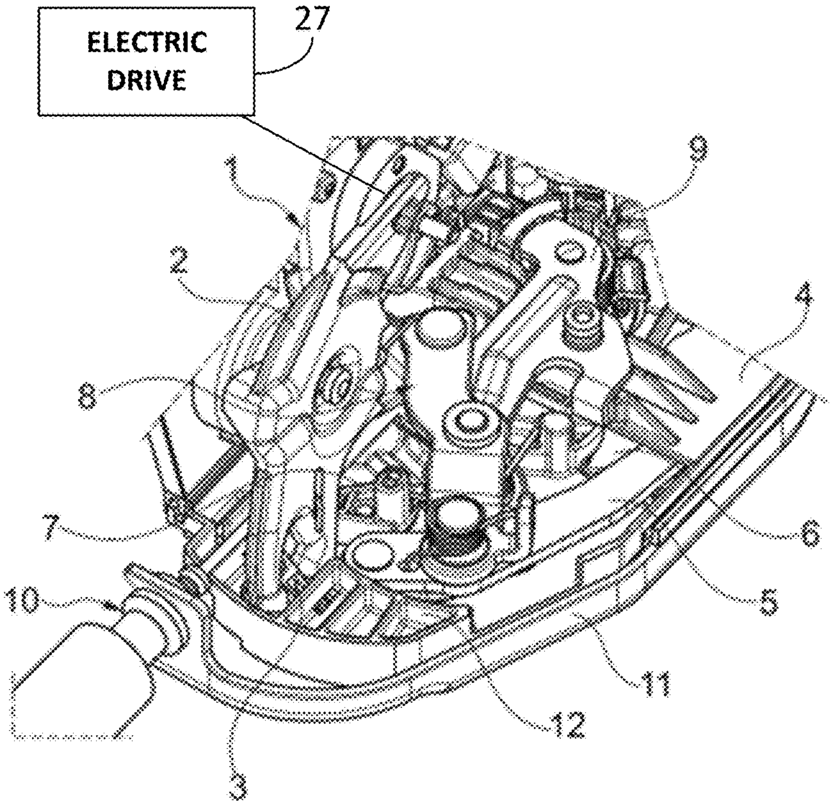
FIG. 1 shows a three-dimensional view of a motor vehicle lock equipped according to the invention, wherein the housing is shown only in regions for better illustration of the invention.

FIG. 1 shows a three-dimensional representation of a motor vehicle lock 1 according to the invention with a view of the components necessary for explaining the invention. A release lever 2, an ejector lever 3, a part of a lock housing 4, a drive or closing pawl 5, a rotary latch 6, a pawl 7, a lever mechanism 8, a reinforcing plate 9 and a Bowden cable unit 10 can be seen. The Bowden cable unit 10 is received in a lock case 11, wherein the lock case 11 at least partially encloses the lock housing 4. The motor vehicle lock 1 is shown in a main latching position and when the lever mechanism 8 of the closing drive is in an unactuated state.

It can be seen in FIG. 1 that the drive pawl 5 comes to rest on one side against an engagement contour 12 of the lock housing 4. In other words, when the lever mechanism 8 is in an unactuated state, the closing pawl 5 is brought out of engagement with the rotary latch 6 by the lock housing 4 and the engagement of the closing pawl 5 in the engagement contour 12.

Figure 2:
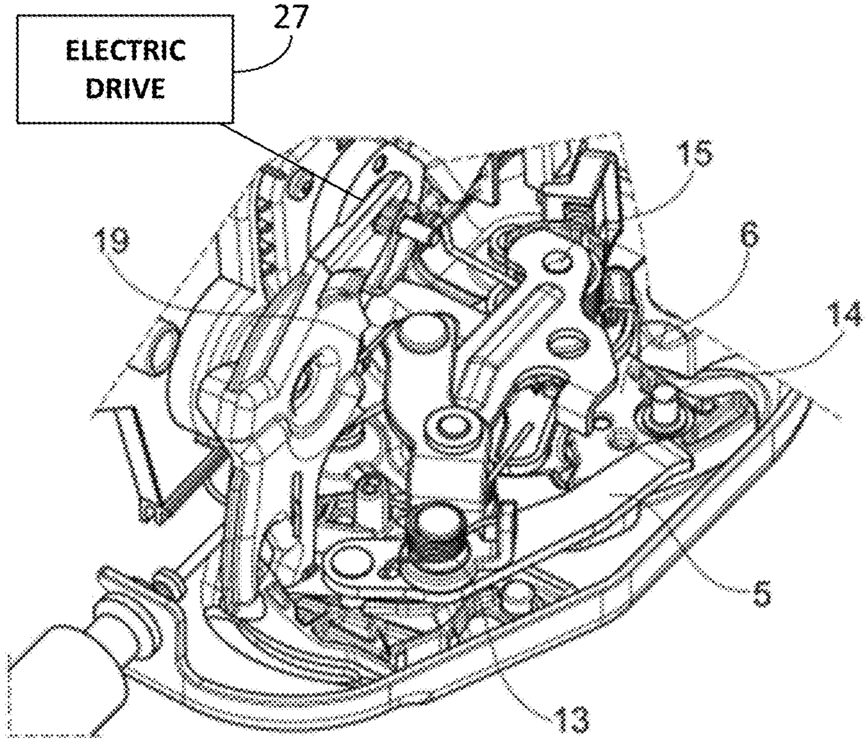
FIG. 2 shows a view of the motor vehicle lock according to the invention according to FIG. 1 without the lock housing in a main latching position of the locking mechanism.

The position of the closing pawl 5 and the main latching position of the locking mechanism is also shown in FIG. 2, wherein a part of the lock housing 4 is not shown in FIG. 2, namely that which blocks the view of the rotary latch 6. In FIG. 2, as also in FIG. 1, the closing pawl 5 is held out of engagement with the rotary latch 6. A spring element 13 acts on the closing pawl 5 in such a way that the closing pawl 5 rests against the engagement contour 12 of the lock housing 4.

As can clearly be seen in FIG. 2, in this embodiment variant of the invention, the rotary latch 6 has a closing bolt 14 via which the rotary latch 6 in combination with the drive pawl 5 can be transferred into an overstroke and ultimately into the main latching position. As further shown in detail, the drive pawl 5 engages with the closing bolt 14 of the rotary latch 6 so that the rotary latch can be pivoted around a shaft 15 in an electrically driven manner.

Figure 3:
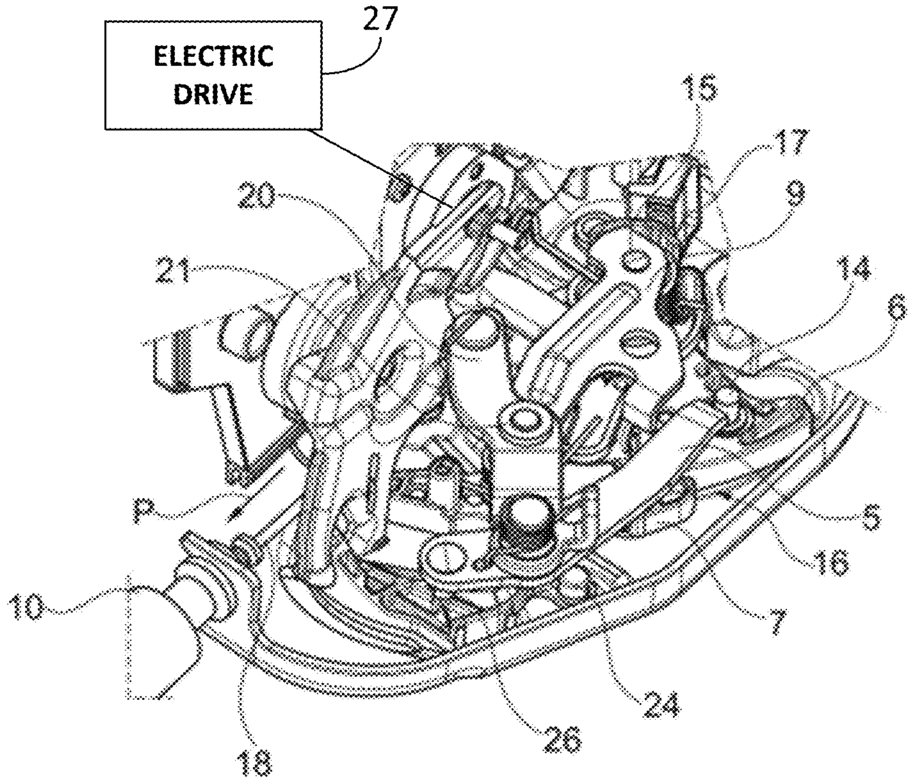
FIG. 3 shows the motor vehicle lock according to the invention according to FIG. 1 in a pre-latching position with the drive pawl in engagement with the rotary latch.

FIG. 3 shows the pre-latching position of the locking mechanism consisting of the rotary latch 6 and pawl 7. The pre-latching position can be achieved, for example, by means of a manual closing of a door element. The pawl 7 engages in a first pre-locking contour of the rotary latch 6.

If the pre-latching position is now detected, for example, by means of a sensor element 17, for example a microswitch 17, a control command can be sent to the closing drive which then moves or pulls a Bowden cable 18 of the Bowden cable unit 10 in the direction of the arrow P. By moving the Bowden cable 18 in the direction of the arrow P, a first lever element 19 of the lever mechanism 8 is actuated, wherein the first lever element 19 interacts pivotably with the actuating lever 20 as the second lever element. The actuating lever 20 is pivotable or movable about the pawl shaft 21. The actuating lever 20 is therefore provided with a fixed bearing position by the shaft 21 of the pawl 7. The bearing point 21 of the pawl 7 is additionally stabilized by the reinforcing plate 9. Due to the at least first or partial movement of the actuating lever 20 about the shaft 21, the closing pawl 5 comes into engagement with the closing bolt 14 by resting against the engagement contour 12 and by the corresponding spring bias by the spring element 13. This practically results in an interaction between the closing pawl 5 and the lock housing 4.

As already mentioned, the pre-latching position of the locking mechanism 16 is shown in FIG. 3. As a result of the partial actuation of the Bowden cable unit 10, the closing pawl 5 comes into engagement with the closing bolt 14 so that a closing process can take place from the pre-latching position shown in FIG. 3 into a main latching position.

Figure 4:
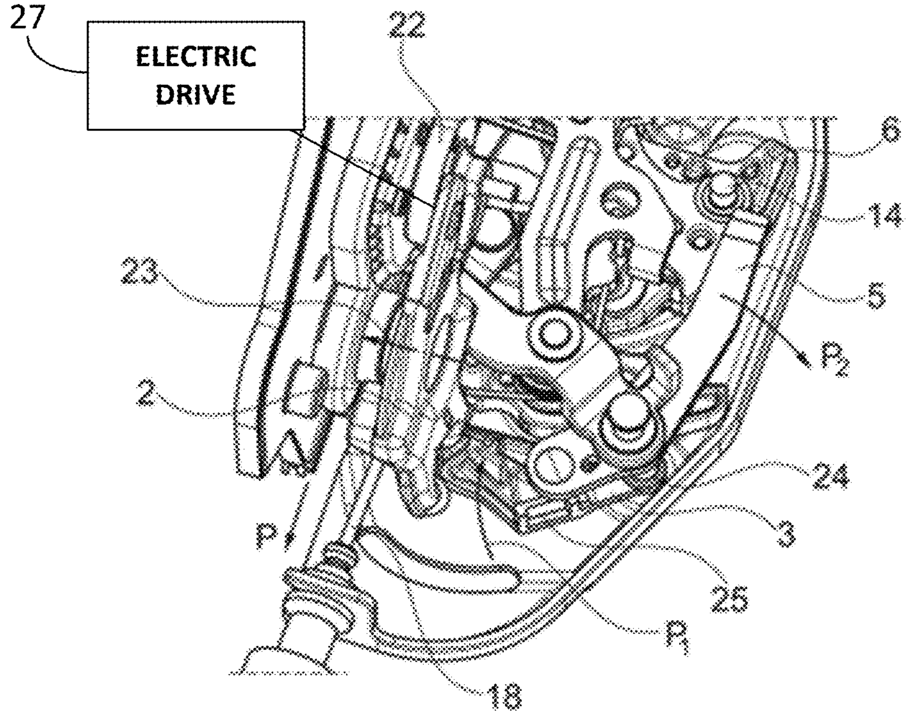
FIG. 4 shows the motor vehicle lock according to FIG. 1 in a closed position and in a position in which the ejector lever has brought the closing or drive pawl out of engagement with the rotary latch.
Figure 5:
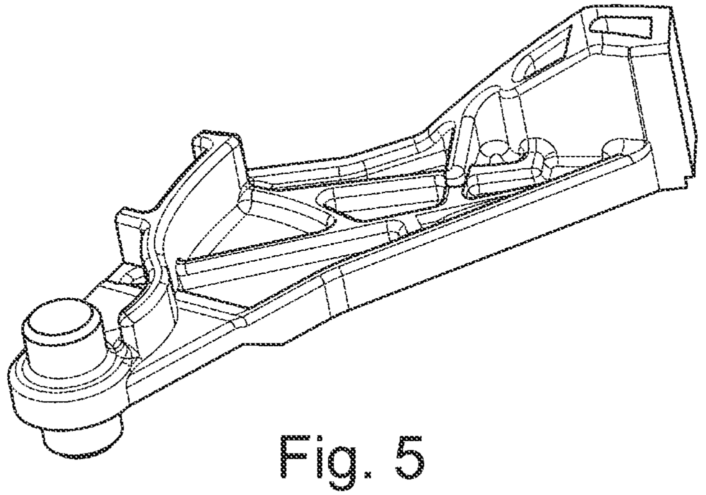
FIG. 5 shows an ejector lever designed according to the invention.
Figure 6:
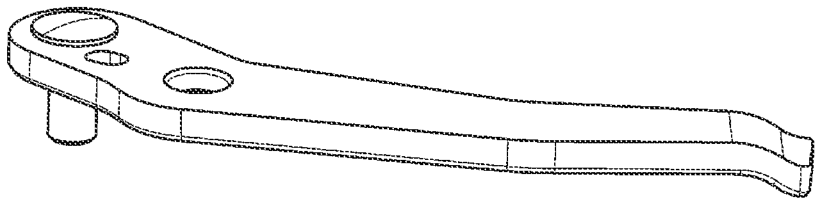
FIG. 6 shows an embodiment of the drive or closing pawl.

The main latching position of the rotary latch 6 is shown in FIG. 4, and the actuation of the ejector lever 3 is also shown. If, during the course of the closing process, an unlocking or opening of the motor vehicle lock is initiated for example by an operator, the release lever 2 is actuated. In this exemplary embodiment, the release lever 2 is driven via an electric drive 27 and in this case via a cam disk 22 so that the release lever 2 is moved counterclockwise about the shaft 23 in this exemplary embodiment. The ejector lever 3 is pivotable about a shaft 24. In this exemplary embodiment, the ejector lever 3 is received in the lock case 11. Due to the movement of the release lever 2, the ejector lever 3 is moved clockwise in the direction of the arrow P1 so that an actuating or control contour 25 comes into engagement with a bolt 26 on the closing pawl 5. Due to the interaction of the ejector lever 3 with the closing pawl 5, the closing pawl 5 is then disengaged from the closing bolt 14 of the rotary latch.

By actuating the release lever 2, on the one hand the ejector lever 3 as well as the pawl 7 are moved, so that the rotary latch 6 comes out of engagement with the closing pawl 5 on the one hand and the pawl 7 on the other hand. The rotary latch 6 is therefore unlocked and is free to move. By means of a door or hatch seal and a rotary latch spring, the pawl can be moved in the opening direction and release a lock holder. The door or hatch element comes free and can be opened unhindered.

LIST OF REFERENCE SIGNS

1 Motor vehicle lock
2 Release lever
3 Ejector lever
4 Lock housing
5 Drive or closing pawl
6 Rotary latch
7 Pawl
8 Lever mechanism
9 Reinforcing plate
10 Bowden cable unit
11 Lock case
12 Engagement contour
13 Spring element
14 Closing bolt
15, 21, 23, 24 Shaft
16 Locking mechanism
17 Sensor, microswitch
18 Bowden cable
19 First lever element
20 Second lever element, actuating lever
22 Cam disk
25 Actuating or control contour
26 Bolt
P, P1, P2 Arrow
27 Electric Drive

The invention claimed is:

1. A motor vehicle lock comprising:
- a locking mechanism comprising a rotary latch and a pawl,
- a closing device having a drive pawl for driving the rotary latch,
- a lock housing, wherein the drive pawl is actuated into engagement with the rotary latch, and
- a release lever, wherein actuation of the release lever results in the drive pawl disengaging from the rotary latch,
- further comprising a lever mechanism, wherein the drive pawl is actuated by the lever mechanism,
- wherein a part of the lever mechanism is mounted on a shaft of the locking mechanism, and
- wherein the shaft is a shaft of the pawl.

2. The motor vehicle lock according to claim 1, wherein the release lever is brought indirectly into engagement with the drive pawl via a transmission positioned between the release lever and the drive pawl.

3. The motor vehicle lock according to claim 1, further comprising an ejector lever, wherein the release lever is brought into engagement with the ejector lever and the ejector lever deflects the drive pawl to release the drive pawl from engagement with the rotary latch.

4. The motor vehicle lock according to claim 1, wherein the release lever is actuatable electrically.

5. The motor vehicle lock according to claim 3, wherein the release lever engages at least partially over the ejector lever.

6. The motor vehicle lock according to claim 3, wherein the ejector lever is pivotably mounted in the lock housing.

7. The motor vehicle lock according to claim 3, wherein the ejector lever has a control contour for engagement with the drive pawl.

8. The motor vehicle lock according to claim 7, wherein the drive pawl has a bolt that is brought into engagement with the control contour of the ejector lever.

9. The motor vehicle lock according to claim 3, wherein the release lever has two arms including a first arm for actuation of the release lever and a second arm, wherein an end of the second arm straddles a portion of the ejector lever.

10. The motor vehicle lock according to claim 9, wherein the second arm is longer than the first arm.

11. The motor vehicle lock according to claim 9, wherein the release lever further has a third arm for actuating the pawl.

12. The motor vehicle lock according to claim 5, wherein the ejector lever has an extension and the release lever is pivotally mounted such that the release lever engages with the extension of the ejector lever.

13. The motor vehicle lock according to claim 7, wherein the control contour comprises an elevation on the ejector lever that engages with a chamfer on the drive pawl.

14. The motor vehicle lock according to claim 1, wherein the lever mechanism includes a first lever that is pivotally fastened to a second lever, the second lever being an actuating lever that interacts with the drive pawl.

15. A motor vehicle lock comprising:
- a locking mechanism comprising a rotary latch and a pawl,
- a closing device having a drive pawl for driving the rotary latch,
- a lock housing, wherein the drive pawl is actuated into engagement with the rotary latch, and
- a release lever, wherein actuation of the release lever results in the drive pawl disengaging from the rotary latch,
- further comprising an ejector lever, wherein the release lever is brought into engagement with the ejector lever and the ejector lever deflects the drive pawl to release the drive pawl from engagement with the rotary latch, and wherein the release lever has two arms including a first arm for actuation of the release lever and a second arm, wherein an end of the second arm straddles a portion of the ejector lever.

16. The motor vehicle lock according to claim 15, wherein the second arm is longer than the first arm.

17. The motor vehicle lock according to claim 15, wherein the release lever further has a third arm for actuating the pawl.

* * * * *